(12) United States Patent
Dalmis et al.

(10) Patent No.: US 9,499,722 B2
(45) Date of Patent: Nov. 22, 2016

(54) METHOD FOR PRODUCING BONDS

(75) Inventors: Gabriel Dalmis, Hamburg (DE); Niko Diamantis, Bönningstedt (DE); Thilo Dollase, Hamburg (DE)

(73) Assignee: TESA SA, Norderstedt (DE)

( * ) Notice: Subject to any disclaimer, the term of this patent is extended or adjusted under 35 U.S.C. 154(b) by 298 days.

(21) Appl. No.: 13/502,304

(22) PCT Filed: Oct. 5, 2010

(86) PCT No.: PCT/EP2010/064845
§ 371 (c)(1),
(2), (4) Date: Jun. 6, 2012

(87) PCT Pub. No.: WO2011/047958
PCT Pub. Date: Apr. 28, 2011

(65) Prior Publication Data
US 2012/0251757 A1    Oct. 4, 2012

(30) Foreign Application Priority Data
Oct. 19, 2009   (DE) .................... 10 2009 045 812

(51) Int. Cl.
*C09J 7/00*    (2006.01)
*C09J 5/00*    (2006.01)
*C09J 7/02*    (2006.01)

(52) U.S. Cl.
CPC .. *C09J 5/00* (2013.01); *C09J 7/00* (2013.01); *C09J 7/02* (2013.01); *C09J 2201/622* (2013.01); *C09J 2433/00* (2013.01); *C09J 2465/005* (2013.01); *Y10T 428/1476* (2015.01)

(58) Field of Classification Search
CPC ............... C09J 7/0207; C09J 7/0228; C09J 7/0232; C09J 7/0235
See application file for complete search history.

(56) References Cited

U.S. PATENT DOCUMENTS

| | | |
|---|---|---|
| 3,632,386 A | 1/1972 | Hurst |
| 4,181,752 A | 1/1980 | Martens et al. |
| 4,454,266 A | 6/1984 | Coughlan et al. |
| 4,728,571 A | 3/1988 | Clemens et al. |
| 5,100,976 A | 3/1992 | Hamada et al. |
| 5,208,300 A | 5/1993 | Krahnke et al. |
| 5,281,455 A | 1/1994 | Braun et al. |
| 2003/0064188 A1* | 4/2003 | Patel et al. ............ 428/40.1 |
| 2005/0154166 A1 | 7/2005 | Husemann et al. |
| 2007/0031641 A1* | 2/2007 | Frisch et al. ............ 428/172 |
| 2007/0110941 A1* | 5/2007 | Utesch et al. ............ 428/40.1 |
| 2007/0221327 A1* | 9/2007 | Zoller ............ 156/329 |
| 2007/0241436 A1 | 10/2007 | Ookubo et al. |
| 2008/0176086 A1 | 7/2008 | Irifune |
| 2008/0311333 A1 | 12/2008 | Yoon et al. |
| 2009/0258225 A1* | 10/2009 | Nishida et al. ............ 428/352 |
| 2010/0003481 A1 | 1/2010 | Nakabayashi et al. |

FOREIGN PATENT DOCUMENTS

| | | |
|---|---|---|
| DE | 4319023 C1 | 9/1994 |
| EP | 0108208 A2 | 5/1984 |
| EP | 0370689 A2 | 5/1990 |
| EP | 0942055 A1 | 9/1999 |
| EP | 1035185 A2 | 9/2000 |
| EP | 1820833 A2 | 8/2007 |
| JP | H09505103 A | 5/1997 |
| JP | 2001049200 A | 2/2001 |
| JP | 2001279199 A | 10/2001 |
| JP | 2003096414 A | 4/2003 |
| WO | 2008078828 A1 | 7/2008 |

OTHER PUBLICATIONS

International Search Report for PCT/EP2010/064845 dated Jan. 24, 2011.
German Search Report for DE 10 2009 045 812.3 dated Jul. 29, 2010.
English language abstract for EP 1035185 found on espacenet.com.
English language abstract for DE 4319023 found on espacenet.com.
English Language Translation of JP Office Action for JP Application 2012-534615 mailed May 27, 2014.
Kinning, et al. "Release Coatings for Pressure Sensitive Adhesives", Adhesion Science and Engineering—vol. 2: Surfaces, Chemistry & Applications, Elsevier, Amsterdam, pp. 535-571; 2002.
D. Satas, "Release Coatings", Handbook of Pressure Sensitive Adhesives Technology, 3rd ed., Satas & Associates, Warwick, pp. 632-651; 1999.
D. Jones, et al., "Handbook of Pressure Sensitive Adhesives Technology", D. Satas 3rd ed,Satas & Associates, Warwick, pp. 652-683, 1999.

* cited by examiner

*Primary Examiner* — Jeff Aftergut
*Assistant Examiner* — Jaeyun Lee
(74) *Attorney, Agent, or Firm* — Norris McLaughlin & Marcus PA

(57) ABSTRACT

The invention relates to a method for producing a bonding of two substrates of which at least one is transparent and of which at least one has a surface having a surface energy (measured according to test method C) of 40 mN/m at maximum, comprising the use off a double-sided adhesive product having a first and a second adhesive surface, wherein the first adhesive surface is covered by a first separating layer and the second adhesive surface is covered by a second separating layer, wherein the pull-off force of the first separating layer from the first adhesive surface, $AZK_1$, is less than the pull-off force of the second separating layer from the second adhesive surface, $AZK_2$, and wherein the ratio of adhesion force of the fresh bond of the first adhesive surface on a surface having a surface energy (measured according to test method C) of 40 mN/m at maximum ($KK_{fresh}$, measured according to test method B) to the pull-off force (measured according to test method A) of the second separating layer from the second adhesive surface, $KK_{fresh}$: $AZK_2$, equals at least 13.5, comprising the following step: (a) removing the first separating layer from the first adhesive surface and bringing the first adhesive surface into contact with the surface having a surface energy (measured according to test method C) of 40 mN/m at maximum.

10 Claims, No Drawings

METHOD FOR PRODUCING BONDS

This application is a 371 application of PCT/EP2010/064845 filed Oct. 5, 2010, which claims priority to the German application DE 10 2009 045 812.3.0 filed Oct. 19, 2009.

The invention relates to methods for producing substantially defect-free adhesive bonds, using pressure-sensitively adhesive products having first and second pressure-sensitively adhesive surfaces, the first pressure-sensitively adhesive surface being lined with a first release layer and the second pressure-sensitively adhesive surface being lined with a second release layer. These products comprise release layers which (a) in terms of their level of release force, can be produced reproducibly and therefore not at too low a level, (b) exhibit a sufficient gradation of release force between first and second release layers, thus ensuring reliable detachment of the first release layer at the time of bonding, and (c) have a sufficiently low release force on the part of the second release layer, to prevent effectively any unintended redetachment, including partial redetachment, of the freshly bonded first pressure-sensitively adhesive surface from the bond substrate during the operation of detaching the second release layer, especially from a surface having a low surface energy.

The invention, moreover, relates to the stated pressure-sensitively adhesive products themselves and also to methods for producing them, and to the use of such products, as for example in the transfer of pressure-sensitive adhesive layers to a substrate, more particularly for the purpose of equipping high-grade optical components with optically clear adhesive layers.

PRIOR ART

On the basis of their ease of processing by comparison with liquid adhesives, their permanent tack, and the fact that they do not need to cure after application, double-sidedly pressure-sensitively adhesive products offer a high utility in application fields of connective adhesive bonding. Among these products, one class are those which comprise a carrier material. They include double-sided adhesive tapes and carrier-free products, such as adhesive transfer tapes, for example. In both product categories, the top and bottom surfaces are pressure-sensitively adhesive—that is, permanently adhesive. In order to protect these surfaces from contamination and unwanted premature bonding before the time of application, the pressure-sensitively adhesive surfaces are typically lined temporarily with redetachable auxiliary carrier materials. Where the double-sidedly pressure-sensitively adhesive products are in sheet form, one sheet of an auxiliary carrier material is used to line the bottom face, and a second sheet for the top face. Where the double-sidedly pressure-sensitively adhesive products are in roll form, it is likewise possible to employ two auxiliary carrier materials, or else a single sheet with provision on its front and back faces such that at the time of application of the pressure-sensitively adhesive product, it is detachable again first from one pressure-sensitively adhesive surface and subsequently from the second such surface.

Auxiliary carrier materials employed are typically papers or films with provision on one or both sides such that a pressure-sensitively adhesive layer can be separated reversibly from the contact face. Accordingly, the terms "release papers" or "release films" are used and also, generally, "release liners". In order to furnish their surface or surfaces with a release function, the carrier papers or carrier films are coated more particularly with a release varnish.

Release varnishes are based on formulations of low surface energy. One important class of formulation are silicone-based systems [D. Satas in "Handbook of Pressure Sensitive Adhesives Technology", D. Satas (ed.), 3rd edn., 1999, Satas & Associates, Warwick, pp. 632-651]. In order to ensure reliable redetachment of the release liner in a manner specific to the application, it is necessary to harmonize the release properties with the adhesive properties of the pressure-sensitively adhesive product. A central parameter describing the detachment behavior is the release force. In many cases as well the peel force is selected for describing the detachment characteristics.

It is usual to categorize release liners according to their release force. Satas categorizes release systems as "super low release", with release values of between 4 and 8 g/25 mm (corresponding to about 1.5 cN/cm and 3 cN/cm), respectively, "low release" for release values of 8 to 25 g/25 mm (about 3 cN/cm and 10 cN/cm), "normal release" for release values of 25 to 50 g/25 mm (about 10 cN/cm and 20 cN/cm), "moderate release" for release values of 50 to 150 g/25 mm (about 20 cN/cm and 60 cN/cm), "moderately tight release" for release values of 150 to 250 g/25 mm (about 60 cN/cm and 100 cN/cm), "tight release" for release values of 250 to 500 g/25 mm (about 100 cN/cm and 200 cN/cm), and "very tight release" for release values of 500 to 2000 g/25 mm (about 200 cN/cm and 800 cN/cm).

U.S. Pat. No. 4,728,571 categorizes release force ranges for strongly adhering pressure-sensitive adhesives (PSAs) as "low" (50 to 150 cN/cm), "intermediate" (250 to 500 cN/cm), and "high" (600 to >1000 cN/cm).

Kinning distinguishes a "premium" release system, with release forces of between 1 and 10 g/cm (corresponding to about 1 cN/cm and 10 cN/cm), a "modified" release system, with release forces of between 10 and 50 g/cm (about 10 cN/cm and 50 cN/cm), and a "tight" release system, with release forces of between 50 and 500 g/cm (about 50 cN/cm and 500 cN/cm) [D. J. Kinning, H. M. Schneider in "Adhesion Science and Engineering volume 2: Surfaces, Chemistry & Applications", M. Chaudhury, A. V. Pocius (Eds.), 2002, Elsevier, Amsterdam, p. 535].

Fully cured, silicone-based release varnishes offer very low release forces ("premium"). In many applications, however, higher release forces are required. The "premium" systems may for this purpose have what are called Controlled release agents (CRAs) added to them. EP 108 208 proposes certain CRAs. "Tight" systems are proposed in US 2008/176,086, for example.

In commonplace methods for producing double-sided self-adhesive products, especially for producing adhesive transfer tapes, the PSA formula is coated onto a first release liner web (release liner A) and subsequently is either lined with a second release liner web (release liner B) and then cured [U.S. Pat. No. 4,181,752], or first dried/cured and then lined with a second release liner web [U.S. Pat. No. 5,281,455; DE 431 90 23], before the assembly is wound up. The adhesive coated on the release liner, however, may also be wound up without lamination of a further material. In this case, the reverse of the release liner may also be furnished with a release system.

In order to ensure practical processing of the double-sidedly pressure-sensitively adhesive products in adhesive application, it is necessary that, in a first processing step, a usually pre-defined pressure-sensitively adhesive surface of the product can be reliably detached from the release layer protecting it, without the double-sidedly pressure-sensitively adhesive product already parting in the meantime from the release layer which is protecting the second pressure-sensitively adhesive surface. For stable processability it is desired that such detachment does not take place even partially from the wrong release liner at this point in the operation.

In applications where particularly high optical quality on the part of the adhesive bond is an issue, even partial transfer of adhesive may lead to irreversible defects in the adhesive, then rendering an optically flawless bond no longer possible.

When the first pressure-sensitively adhesive surface has been freed from the first release layer, the double-sidedly pressure-sensitively adhesive product is typically provided with the target substrate, often one of two objects that are to be bonded. This is followed by the step of the method in which the second pressure-sensitively adhesive surface of the double-sidedly pressure-sensitively adhesive product is exposed, to allow contact to be produced with the second target substrate. The capacity of the double-sidedly pressure-sensitively adhesive products to be processed in such operations is heavily dependent on the release properties of the release layers and on their interplay with the adhesive properties of the pressure-sensitively adhesive layers.

In order to meet this requirement imposed on the double-sidedly pressure-sensitively adhesive products, the release layers of the front/back face of the double-sided release liner, or of release liner A and release liner B, typically, for this purpose, have significantly different release forces. In order to ensure effective unwinding or liner removal of the first release liner side or of the first release liner, self-adhesive products are obtainable which have release force gradations of 1:4 even 1:7. Release liner combinations of a "premium" system with a "modified" or even a "tight" system, in line with the Kinning classification, are not unusual to the skilled person.

Furthermore, U.S. Pat. No. 5,281,455 discloses exemplary product constructions which consist of a silicone-based adhesive layer both sides of which are lined with release liners of the same kind. A stated requirement is that, although the same liner system is used on both sides, there must be a differential detachment behavior, in order to ensure reliable detachment of one release liner first. Production of adhesive transfer tapes takes place, in this example, by coating a first liner with adhesive and lining it with a second liner when the adhesive is dried. There is no disclosure, however, as to the way in which, technically, it is possible to make the release forces of the two identical liners differ sufficiently distinctly, and with which difference in release force.

Further specific proposed solutions to the stated technical requirement are provided by DE 43 19 023. Accordingly, an acrylate-based adhesive transfer tape is lined on both sides with a release film, the release films having been differently siliconized to an extremely low release force level. One release layer has a release force of between 30 and 80 mN/cm, more particularly between 35 and 55 mN/cm, while the second has a release force of between 5 and 30 mN/cm, more particularly between 12 and 25 mN/cm. From this text it is evident that advantageous embodiments are apparently achieved when the silicone release layers are set in such a way that they differ by at least 5 mN/cm, more likely at least 10 mN/cm. The text does not address the need to balance the detachment behavior of the release liners with the bonding strength on the substrate.

Double-sidedly pressure-sensitively adhesive products are employed in the adhesive bonding of a very wide variety of materials. Examples that may be given include glasses, metals, and plastics. In a range of bonding tasks there is a need to achieve sufficient bonding strength to materials having surfaces of low surface energy (LSE). Substrates considered to be of low energy frequently have a surface energy of about 40 mN/m or even of less than 35 mN/m and 30 mN/m. Such materials include, among others, certain UV paints and powder coatings, and also polyolefins such as polypropylene (PP), high-pressure polyethylene (LDPE), low-pressure polyethylene (HDPE), ultra high molecular weight polyethylene (UHMWPE), and polymers formed from ethylene-propylene-diene monomer (EPDM). Materials considered particularly critical are those which as well as a low surface energy additionally have rough surfaces and, furthermore, low hardnesses, such as Shore A hardnesses of less than 50, frequently, indeed, of less than 40. Examples of these materials are open-cell foams of polyethylene, EPDM, polyester or polyurethane. Paints and inks may have low surface energies on the basis of apolar binder components and/or surface-active functional additives such as leveling agents, lubricants or deaerating agents.

Moreover, there are bonding applications where high purity and/or optical quality of all of the components, and hence of the pressure-sensitively adhesive product as well, are important. Particularly appropriate in such sectors are double-sidedly pressure-sensitively adhesive products which comprise straight-acrylate-based adhesive layers, or those which are based on silicones. In some cases, however, adhesives distinguished by very high purity and to which for these applications, therefore, there is no alternative, have bonding strengths which, while still sufficient for the application, are nevertheless lower than those known for other adhesive systems (mention may be made in this context of resin-formulated formulas, whose purity and optical quality is usually unable to match that of—in particular—straight-acrylate-based adhesives, but have higher typical bond strengths).

As well as release forces (determined by the detachment force of test adhesive tapes), the peel force (abbreviated to "AZK", determined by the detachment force of a product-specific adhesive) is very important in characterizing release systems.

The usefulness of a double-sidedly pressure-sensitively adhesive product, therefore, is not solely apparent from reliable detachability of the pressure-sensitively adhesive product from a first release liner or from one side of a double-sided release liner, for which a particular peel force, $AZK1$, must be expended. Instead, it is also necessary to ensure that the peel force for detaching the second release liner or the second side of a double-sided release liner, $AZK2$, is sufficiently low, so that the bond strength of the pressure-sensitive adhesive layer already contacted with the first bonding substrate, in the freshly bonded state, $KK(fresh)$, exceeds it to an extent such that unintended full or partial detachment of the pressure-sensitive adhesive layer from the bond substrate is avoided. In qualitative terms, therefore, it must be the case that $$AZK1<AZK2<KK \text{ (fresh)}.$$

The available values range for $AZK1$ and $AZK2$ is restricted for three reasons.

Firstly, the peel force $AZK1$ cannot be selected at an arbitrarily high level by means of the bonding strength in the fresh state, $KK(fresh)$, which is dictated via the application. Instead, $KK(fresh)$ limits the available values of $AZK2$ toward the top end. This has consequences especially when a bond is to be performed on surfaces of low surface energy.

The lower the level at which AZK2 can be set, the greater the independence that will be gained from KK(fresh) and, consequently, the more universal will be the possible uses of the double-sidedly pressure-sensitively adhesive product.

Secondly, minimal peel forces are necessary, since very low values frequently cannot be realized in an operationally stable way. This limits the available values range for AZK1 toward the bottom end.

Lastly, as already observed via the description of the prior art, it the case that there must be a sufficient gradation present in the peel forces AZK1 and AZK2, in order to allow reliable detachment of the first release layer to be ensured.

Where the difference between KK(fresh) and the minimum possible AZK1 is small, a resulting requirement is that the peel force gradation AZK1:AZK2 is likewise small.

The problem, therefore, is that of providing a double-sidedly pressure-sensitively adhesive product which (a) has a sufficiently low peel force of the second release layer to prevent effectively any unwanted redetachment, even partial, of the freshly bonded first PSA from the bond substrate during the operation of detaching the second release layer, hence permitting, in particular, bonding in optically high-grade quality particularly to surfaces of low surface energy; (b) comprises release layers which in terms of their peel force level can be produced reproducibly and are therefore not at too low a level; and (c) exhibits a peel force gradation between first and second release layers that is extremely low and yet still sufficient, ensuring reliable detachment of the first release layer at the moment of bonding.

The present invention proposes a solution to this hitherto unresolved technical problem, in the form of a new method, using new, double-sidedly pressure-sensitively adhesive products, and also proposes the production and use thereof.

Invention

The present invention relates to a method for producing an adhesive bond of two substrates, of which at least one is transparent and of which at least one has a surface with a surface energy (measured by test method C) of not more than 40 mN/M, preferably not more than 35 mN/m, more preferably not more than 30 mN/m. This transparent substrate may be the substrate having a surface with a surface energy (measured by test method C) of not more than 40 mN/m, preferably not more than 35 mN/m, more preferably not more than 30 mN/m.

The method of the invention encompasses the use of a double-sidedly pressure-sensitively adhesive product having first and second pressure-sensitively adhesive surfaces, the first pressure-sensitively adhesive surface being lined with a first release layer, and the second pressure-sensitively adhesive surface being lined with a second release layer. The peel force of the first release layer from the first pressure-sensitively adhesive surface, AZK1, is lower than the peel force of the second release layer from the second pressure-sensitively adhesive surface, AZK2, and the ratio of the bond strength of the fresh bond of the first pressure-sensitively adhesive surface to a surface having a surface energy (measured by test method C) of not more than 40 mN/m (KKfresh, measured by test method B), preferably of not more than 35 mN/m, very preferably of not more than 30 mN/m, to the peel force (measured by test method A) of the second release layer from the second pressure-sensitively adhesive surface, KKfresh:AZK2, is at least 13.5, preferably 15.0, more preferably 20.0. The method of the invention here comprises the following step:

(a) parting the first release layer from the first pressure-sensitively adhesive surface, and contacting the first pressure-sensitively adhesive surface with the surface having a surface energy (measured by test method C) of not more than 40 mN/m, preferably not more than 35 mN/m, more preferably not more than 30 mN/m.

In one embodiment of the invention, the abovementioned method, additionally to step (a) comprises the following step (b):

(b) parting the second release layer from the second pressure-sensitively adhesive surface.

The invention further relates to the products obtainable by the method of the invention, and also to the products used in these methods. The invention additionally relates to a method for producing the last-mentioned products. Another aspect of the present invention relates to the use of these products for bonding two transparent substrates.

In one embodiment of the invention, the method of the invention comprises the use of a double-sided adhesive tape or of an adhesive transfer tape as double-sidedly pressure-sensitively adhesive product. In another embodiment, the double-sidedly pressure-sensitively adhesive product is one which is wound into an Archimedean spiral.

In accordance with the invention, the double-sidedly pressure-sensitively adhesive product comprises a pressure-sensitive adhesive (PSA) layer having first and second pressure-sensitively adhesive surfaces. This PSA layer may optionally have an interlayer in the form of a carrier. In one particular embodiment, the double-sidedly pressure-sensitively adhesive product is a PSA layer which is lined on each of its pressure-sensitively adhesive surfaces with a release liner.

In one particular mode of embodiment, the present invention relates to a method in which both substrates are transparent.

The invention further relates to a method for producing the pressure-sensitively adhesive products used in accordance with the invention, comprising the following steps:

(i) providing a first release layer;
(ii) providing a pressure-sensitive adhesive layer on the first release layer; and
(iii) lining the pressure-sensitive adhesive layer with a second release layer.

The products used in accordance with the invention are, as described, double-sidedly pressure-sensitively adhesive products having first and second pressure-sensitively adhesive surfaces, the first pressure-sensitively adhesive surface being lined with a first release layer, and the second pressure-sensitively adhesive surface being lined with a second release layer, where in the use of the product, the first release layer is first of all removed from the first pressure-sensitively adhesive surface and the ratio of the bond strength of the fresh bond of the first pressure-sensitively adhesive surface to a surface having a surface energy (measured by test method C) of not more than 40 mN/m (KKfresh, measured by test method B) to the peel force (measured by test method A) of the second release layer from the second pressure-sensitively adhesive surface, KKfresh:AZK2, is at least 13.5. The second release layer, therefore, is matched to the adhesive.

In one preferred embodiment, the ratio of the bond strength of the fresh bond of the first pressure-sensitively adhesive surface on a bond substrate (measured by test method B) to the peel force (measured by test method A) of the second release layer from the second pressure-sensitive adhesive surface, KK(fresh):AZK2, is at least 15.0. In one particularly preferred embodiment, this ratio is at least 20.0.

The method of the invention is directed here to the bonding of two substrate surfaces, with at least one of these substrates being transparent. At least one of the substrate surfaces to be bonded has a surface energy (measured by test method C) of not more than 40 mN/m. In one preferred embodiment, this surface to be bonded has a surface energy of not more than 35 mN/m, very preferably of not more than 30 mN/m.

Surprisingly it has been found that the method of the invention allows adhesive bonding in particularly high optical quality.

The peel force AZK1 is preferably at least 2 cN/cm, very preferably 3.5 cN/cm. The ratio of the peel forces, AZK1:AZK2, is preferably 1:1.5 to 1:4, or else more or less. A small difference in the peel forces, such as 1:1.5, for example, is selected advantageously in order to ensure a sufficient gradation in release behavior between release layer 1 and release layer 2 from the double-sidedly pressure-sensitively adhesive product. A ratio of not more than 1:4, on the other hand, is advantageous in order to set the peel forces of the release layers, especially of the second release layer, as low as possible, in order to maximize the ratio with respect to the fresh bond strength on the target substrate.

In one embodiment of the invention, the bond strength of the second pressure-sensitively adhesive layer to the target substrate is less than 35 cN/cm, preferably less than 20 cN/cm, and more preferably less than 10 cN/cm.

As PSAs in double-sidedly pressure-sensitive adhesive products of the invention it is possible to employ all linear, star-shaped, branched, grafted or otherwise-constructed polymers, preferably homopolymers, random copolymers or block copolymers, which have a molar mass of at least 100 000 g/mol, preferably of at least 250 000 g/mol, very preferably of at least 500 000 g/mol. The polydispersity, given as the ratio of mass average to number average in the molar mass distribution, is preferably at least 2. It is preferred, moreover, for the softening temperature to be lower than 20° C. Molar mass in this context means the weight average of the molar mass distribution as obtainable, for example, from gel permeation chromatography studies. Softening temperature in this context means the quasi-static glass transition temperature for amorphous systems, and the melting temperature for semicrystalline systems, which may be determined, for example, by means of differential scanning calorimetry measurements. Where numerical values are given for softening temperatures, they relate to the midpoint temperature of the glass stage in the case of amorphous systems, and to the temperature at maximum temperature change rate during the phase transition in the case of semicrystalline systems.

As pressure-sensitive adhesives (PSAs), it is possible to use all of the PSAs known to the skilled person, more particularly acrylate-, natural rubber-, synthetic rubber-, silicone- or ethylene-vinyl acetate-based systems. Combinations of these systems can also be used in accordance with the invention.

Acrylate-based PSAs are employed with great preference. As examples, though without wishing to undertake any restriction, mention may be made, as being advantageous in the sense of this invention, of random copolymers based on nonfunctionalized α,β-unsaturated esters, and random copolymers based on nonfunctionalized alkyl vinyl ethers. Preference is given to using α,β-unsaturated carboxylic acids and their derivatives, of the general structure $$CH_2=C(R^1)(COOR^2) \quad (I),$$

where $R^1$ represents H or $CH_3$ and $R_2$ represents H or linear, branched or cyclic, saturated or unsaturated alkyl radicals having 1 to 30, more particularly having 4 to 18, carbon atoms.

Monomers which are used very preferably in the sense of the general structure (I) include acrylic and methacrylic esters with alkyl groups consisting of 4 to 18 C atoms. Specific examples of such compounds, without wishing to impose any restriction through this recitation, are n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, the branched isomers thereof, such as 2-ethylhexyl acrylate and isooctyl acrylate, for example, and also cyclic monomers, such as cyclohexyl acrylate or norbornyl acrylate and isobornyl acrylate, for example.

Likewise employable as monomers are acrylate and methacrylate esters which comprise aromatic radicals, such as phenyl acrylate, benzyl acrylate, benzoin acrylate, phenyl methacrylate, benzyl methacrylate or benzoin methacrylate, for example.

Additionally it is possible optionally to use vinyl monomers from the following groups: vinyl esters, vinyl ethers, vinyl halides, vinylidene halides, and also vinyl compounds which comprise aromatic rings or heterocycles in α-position. For the vinyl monomers optionally employable, mention may be made, by way of example, of selected monomers that can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene, and α-methyl styrene.

Further monomers which can be employed in accordance with the invention are glycidyl methacrylate, glycidyl acrylate, allyl glycidyl ether, 2-hydroxyethyl methacrylate, 2-hydroxyethyl acrylate, 3-hydroxypropyl methacrylate, 3-hydroxypropyl acrylate, 4-hydroxylbutyl methacrylate, 4-hydroxybutyl acrylate, acrylic acid, methacrylic acid, itanonic acid and its esters, crotonic acid and its esters, maleic acid and its esters, fumaric acid and its esters, maleic anhydride, methacrylamide and N-alkylated derivatives, acrylamide and N-alkylated derivatives, N-methylolmethacrylamide, N-methylolacrylamide, vinyl alcohol, 2-hydroxyethyl vinyl ether, 3-hydroxypropyl vinyl ether, and 4-hydroxybutyl vinyl ether.

In the case of rubber, including synthetic rubber, as starting material for the PSA, there are further possible variations, from the group, for example, of the natural rubbers or synthetic rubbers, or from any desired blend of natural rubbers and/or synthetic rubbers, it being possible for the natural rubber or natural rubbers to be selected in principle from all available grades such as, for example, crepe, RSS, ADS, TSR or CV types, depending on required purity level and viscosity level, and for the synthetic rubber or synthetic rubbers to be selected from the group of the randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes, and/or blends thereof.

Additionally it is possible for rubbers to be admixed, for improving their processing properties, preferably with thermoplastic elastomers, with a weight fraction of 10% to 50% by weight, based on the total elastomer fraction. Representatives that may be mentioned at this point are in particular the especially compatible types polystyrene-polyisoprene-polystyrene (SIS) and polystyrene-polybutadiene-polystyrene (SBS).

Silicone-based PSAs as well can be employed especially in the sense of this invention. Where PSAs are used which are based on a condensation-crosslinking silicone, they are composed more particularly of the components identified below:
  a) a hydroxy-functionalized organopolysiloxane which consists of at least one diorganosiloxane unit,
  b) an organopolysiloxane resin with the formula: $(R^1_3SiO_{1/2})_x(SiO_{4/2})_1$, where $R^1$ is a substituted or unsubstituted monovalent hydrocarbon group, a hydrogen atom or a hydroxyl group, and x is a number between 0.5 and 1.2,
  c) optionally a stabilizer,
  d) optionally an initiator.

Silicone PSAs of this kind are freely available commercially. Examples that may be mentioned at this point include the following: DC 280, DC 282, Q2-7735, DC 7358, Q2-7406 from Dow Corning, PSA 750, PSA 518, PSA 910, PSA 6574 from Momentive Performance Materials, KRT 001, KRT 002, KRT 003 from ShinEtsu, PSA 45559 from Wacker Silicones, and PSA 400 and PSA 401 from BlueStar Silicones.

Employed alternatively as PSA are PSAs based on an addition-crosslinked silicone composed of the components identified below:
  a) an organopolysiloxane which consists of at least one diorganosiloxane unit and carries at least one two silicon-bonded alkenyl groups in each molecule,
  b) an organopolysiloxane resin having the formula: $(R^1_3SiO_{1/2})_x(SiO_{4/2})_1$, where $R^1$ is a substituted or unsubstituted monovalent hydrocarbon group, a hydrogen atom or a hydroxyl group and x is a number between 0.5 and 1.2,
  c) an organopolysiloxane which carries on average at least two silicon-bonded hydrogen atoms in each molecule, in an amount such that there are 0.01 to 10 mol of silicon-bonded hydrogen atoms per mol of the total alkenyl groups of components a), b), and e), and which is free from olefinic double bonds,
  d) an organometallic catalyst from group 10 of the periodic table of the elements, and
  e) optionally an inhibitor.

Silicone PSAs of this kind are freely available commercially. Examples that may be mentioned here include the following: DC 7657 and DC 2013 from Dow Corning and KR 3700 and KR 3701 from ShinEtsu.

In order to obtain the desired adhesive properties, the silicone formulations described are admixed with what are called MQ resins, with the formula $(R^1_3SiO_{1/2})_x(SiO_{4/2})_1$. The M unit therein is denoted by the $(R^1_3SiO_{1/2})$ units, the Q unit by the $(SiO_{4/2})$ units. Each $R^1$ independently of any other represents a monovalent saturated hydrocarbon group, a monovalent unsaturated hydrocarbon group, a monovalent halogenated hydrocarbon group, a hydrogen atom or a hydroxyl group. The ratio of M units to Q units (M:Q) is preferably in the range from 0.5 to 1.2.

The MQ resins are advantageously those having a weight-average molecular weight $M_w$ of 500 g/mol≤$M_w$≤100 000 g/mol, preferably of 1 000 g/mol≤$M_w$≤25 000 g/mol, with the figures for the average molecular weight $M_w$ in this specification relating to the determination by gel permeation chromatography.

It has emerged as being advantageous if adhesives are used in which the proportional ratio—based on percent by weight—of polydiorganosiloxane to MQ resin is in the range from 20:80 to 80:20, preferably in the range from 30:70 to 60:40.

MQ resins of this kind are freely available commercially. Examples that may be mentioned here include the following: SL 160, SL 200, and DC 2-7066 from Dow Corning, SR 545, SR 1000, and 6031 SL from Momentive Performance Materials, and CRA 17, CRA 42, and MQ-Harz 803 from Wacker.

In addition to the resin modification it is also possible to add further additives to the silicone-based PSA. Further additives which can be utilized include the following:
  in-process stabilizers, such as, for example, vinylsilanes or alkynols as inhibitors for the platinum catalyst
  process accelerants such as, for example, aminoorganyls
  fillers, such as, for example, silicon dioxide, glass (ground or in the form of beads), aluminum oxides or zinc oxides, the fillers being more particularly so finely ground or otherwise prepared that they are optically invisible
  optionally, further polymers, preferably elastomeric in nature; elastomers which can be utilized accordingly include, among others, those based on pure hydrocarbons, examples being unsaturated polydienes, such as natural or synthetically produced polyisoprene or polybutadiene; chemically substantially saturated elastomers, such as, for example, saturated ethylene-propylene copolymers, α-olefin copolymers, polyisobutylene, butyl rubber, ethylene-propylene rubber, and also chemically functionalized hydrocarbons, such as, for example, halogen-containing, acrylate-containing or vinyl ether-containing polyolefins, to name but a few
  plasticizers, such as, for example, liquid resins, plasticizer oils or low molecular mass liquid polymers, such as, for example, low molecular mass silicone oils having molar masses <1500 g/mol (number average).

In order to achieve sufficient cohesion, the condensation-crosslinking silicone PSAs are preferably compounded with peroxo initiators. Used with particular preference for this purpose is benzoyl peroxide (BPO). The peroxo initiators are used more particularly in an amount of 0.2% to 5% by weight, based on the solids fraction of the silicone adhesive. In order to obtain a reasonable measure between cohesion and adhesion, a BPO content of 0.5% to 2% by weight is selected more particularly. Where the adhesive is coated from solvent, a temperature of 70-90° C. is selected first of all, for at least two minutes, in order for the solvents to evaporate. Subsequently a temperature of 170-180° C. is set for at least two minutes, in order to initiate the disintegration of the peroxide and hence the process of crosslinking.

Achieving a sufficient cohesion for addition-crosslinking silicone adhesives is accomplished more particularly by a platinum-catalyzed hydrosilylation reaction between the alkenyl-functionalized organopolysiloxanes and the corresponding SiH functionalized organopolysiloxanes. In this case, with coating from solution, the solvent is first of all removed at a temperature of 70-90° C. and a residence time of at least two minutes. Subsequently the temperature is raised to 100-120° C. and is kept constant for up to two minutes.

In addition to the conventional modes of crosslinking of silicone PSAs, by means of peroxides or transition metal catalysis, it is also possible for these adhesives to be crosslinked by actinic radiation, especially electron beams. In this case, with coating from solution, the solvent is first of all removed at a temperature of 70-90° C. and a residence time of at least two minutes. This is followed by crosslinking with an electron beam dose of at least 10 kGy. This type of crosslinking is especially advantageous, since it allows the cohesion to be set almost infinitely, without adversely influencing the properties of tack and adhesion.

As tackifying resins which can optionally be used it is possible, in combination with the stated and other adhesive base polymers or base polymer mixtures, to use, without exception, all known tackifier resins described in the literature. Representatives that may be mentioned are the rosins, their disproportionated, hydrogenated, polymerized, and esterified derivatives and/or salts, the aliphatic and aromatic hydrocarbon resins, terpene resins and terpene-phenolic resins. Any desired combinations of these and further resins may be used in order to adjust the properties of the resultant adhesive in accordance with requirements. In many methods of the invention, however, the addition of tackifier resins is not tolerated, owing to their effects of diminishing the optical quality of the bonding layer.

As plasticizers, which are likewise possible for optional use, it is possible to use all plasticizing substances that are known from self-adhesive tape technology. These include, among others, the paraffinic and naphthenic oils, (functionalized) oligomers such as oligobutadienes and oligoisoprenes, liquid nitrile rubbers, liquid terpene resins, vegetable and animal fats and oils, phthalates and functionalized acrylates. PSAs as indicated above may, moreover, comprise additional constituents such as additives with rheological activity, catalysts, initiators, stabilizers, compatibilizers, coupling reagents, crosslinkers, antioxidants, other ageing inhibitors, light stabilizers, flame retardants, pigments, dyes, fillers and/or expandants, and also, optionally, solvents.

For applications where particularly high purity and/or optical quality is required, resin-free acrylate-based or silicone-based PSA layers are outstandingly suitable.

As carrier materials, where they are desired in corresponding variants, it is possible in principle, in double-sidedly pressure-sensitive adhesive products of the invention, to use all of the types that are known to the skilled person from the self-adhesive product sector, and more particularly those possessing high optical quality.

Without wishing to impose any restriction as a result of this recitation, it is possible, for producing the carrier film, to use all film-forming polymers that are extrudable. One preferred embodiment uses polyolefins. Preferred polyolefins are prepared from ethylene, propylene, butylene and/or hexylene, it being possible in each case to polymerize the pure monomers or to copolymerize mixtures of the stated monomers. Through the polymerization process and through the selection of the monomers it is possible to direct the physical and mechanical properties of the polymeric film, such as the softening temperature and/or the tensile strength, for example.

Another preferred embodiment of this invention uses polyvinyl acetates. Polyvinyl acetates may comprise vinyl alcohol as well as vinyl acetate as a comonomer, with the free alcohol fraction being variable within wide limits. Another preferred embodiment of this invention uses polyester as carrier film. In one particularly preferred embodiment of this invention, polyesters based on polyethylene terephthalate (PET) are used. Special high-transparency PET films can be used in particular. Suitability is accordingly possessed, for example, by films from Mitsubishi with the trade name Hostaphan™ or from Toray with the trade name Lumirror™ or from DuPont Teijin with the trade name Melinex™. Another highly preferred species of the polyesters is represented by the polybutylene terephthalate films. Polyethylene naphthalate (PEN) is suitable as well. A further preferred embodiment of this invention uses polyvinyl chlorides (PVC) as film. For the purpose of increasing the temperature stability, the polymer constituents present in these films may be prepared using stiffening comonomers. Furthermore, in the course of the inventive process, the films may be radiation-crosslinked, in order to obtain a similar improvement in properties. Where PVC is employed as a raw material for film, it may optionally comprise plastifying components (plasticizers). Another preferred embodiment of this invention uses polyamides for producing films. The polyamides may consist of a dicarboxylic acid and a diamine or of two or more dicarboxylic acids and diamines. Besides dicarboxylic acids and diamines it is possible to use higher functional carboxylic acids and amines, both alone and in combination with the aforementioned dicarboxylic acids and diamines. To stiffen the film it is preferred to use cyclic, aromatic or heteroaromatic starting monomers. Another preferred embodiment of this invention uses polymethacrylates for producing films. In this case it is possible for the choice of monomers (methacrylates and in some cases also acrylates) to direct the glass transition temperature of the film. Furthermore, the polymethacrylates may also comprise additives, in order, for example, to increase the flexibility of the film or to raise or lower the glass transition temperature, or to minimize the formation of crystalline segments. Another preferred embodiment of this invention uses polycarbonates for producing films. Furthermore, in another embodiment of this invention, polymers and copolymers based on vinyl aromatics and vinyl heteroaromatics may be employed for producing the carrier film. An example is polystyrene (PS). Furthermore, polyethersulfone films and polysulfone films may be used as carrier materials. They can be acquired, for example, from BASF under the trade name Ultrason™ E and Ultrason™ S. Furthermore, it is also possible with particular preference to use high-transparency TPU films. These films are available commercially, for example, from Elastogran GmbH. It is also possible to use high-transparency films based on polyvinyl alcohol and polyvinyl butyral.

For producing a material in film form it may be appropriate to add additives and other components which enhance the film-forming properties, reduce the tendency for crystalline segments to be formed, and/or specifically improve or else, where appropriate, impair the mechanical properties.

Besides single-layer films it is also possible to use multilayer films, which are produced in coextruded form, for example. For this purpose it is possible to combine the aforementioned polymer materials with one another.

Furthermore, the films may have been treated. Thus, for example, vapor depositions or sputtering operations may have been performed, using zinc oxide, for example, or varnishes or adhesion promoters may have been applied. A further possible form of additization is represented by UV protectants, which may be present as additives in the film or may have been applied as a protective layer.

The carrier film may also, for example, have an optical coating. Particularly suitable optical coatings are those which reduce the reflection. This is done, for example, by lowering the difference in refractive index for the transition from air to optical coating.

For producing release liners A and B preferred in accordance with the invention, or for producing a release liner with double-sided release, it is likewise possible in principle to use all film-forming and extrudable polymers which are equipped preferably on one side or both sides with release systems. Examples can be found in the collations by Satas, Kinning and Jones that are cited at this point [D. Satas in "Handbook of Pressure Sensitive Adhesives Technology", D. Satas (ed.), 3rd edn., 1999, Satas & Associates, Warwick, pp. 632-651; D. J. Kinning, H. M. Schneider in "Adhesion Science and Engineering—Volume 2: Surfaces, Chemistry & Applications". M. Chaudhury, A. V. Pocius (ed.), 2002, Elsevier, Amsterdam, pp. 535-571; D. Jones, Y. A. Peters in "Handbook of Pressure Sensitive Adhesives Technology", D. Satas (ed.), 3rd edn., 1999, Satas & Associates, Warwick, pp. 652-683].

In one preferred embodiment of the invention, release liners are composed of a carrier film which is equipped on one or both sides with a release varnish preferably based on silicone. A preferred embodiment of this invention uses polyolefins as carrier material for the release liners. Preferred polyolefins are prepared from ethylene, propylene, butylene and/or hexylene, it being possible in each case to polymerize the pure monomers or to copolymerize mixtures of the stated monomers. Through the polymerization process and through the selection of the monomers it is possible to direct the physical and mechanical properties of the polymeric film, such as the softening temperature and/or the tensile strength, for example. One particularly preferred embodiment of this invention employs polyesters based on polyethylene terephthalate (PET) as carrier material for the release liners. In particular, specific hgih-transparent PET films can be used. Thus, for example, suitability is possessed by films from Mitsubishi with the trade name Hostaphan™ or from Toray with the trade name Lumirror™ or from DuPont Teijin with the trade name Melinex™.

Furthermore, various papers, optionally also in combination with a stabilizing extrusion coating, are contemplated as carrier material for release liners. All of the stated release liners acquire their antiadhesive properties by means of one or more coating passes, for example, but preferably, with a silicone-based release. Application may take place on one or both sides.

Release liners may, moreover, carry a fluoro-siliconization as release medium. This is advantageous more particularly for lining silicone-based PSA layers. Besides fluorosilicone systems, coatings of fluorinated hydrocarbons on release liners are also suitable with preference.

In one very preferred embodiment of the invention, the release varnishes are graduated. In other words, the release values differ on the first and second release layers. In this way, it is ensured that the double-sided pressure-sensitively adhesive product or pressure-sensitively adhesive intermediate can be unwound. The ratio AZK1:AZK2 is preferably between 1:1.5 and 1:4, or more or less.

All of the approaches familiar to the skilled person for setting the release properties of the release layers can be employed in principle in the sense of this invention. Compilations of control possibilities are collated by Satas, Kinning and Jones [D. Satas in "Handbook of Pressure Sensitive Adhesives Technology", D. Satas (ed.), 3rd edn., 1999, Satas & Associates, Warwick, pp. 632-651; D. J. Kinning, H. M. Schneider in "Adhesion Science and Engineering—Volume 2: Surfaces, Chemistry & Applications". M. Chaudhury, A. V. Pocius (ed.), 2002, Elsevier, Amsterdam, pp. 535-571; D. Jones, Y. A. Peters in "Handbook of Pressure Sensitive Adhesives Technology", D. Satas (ed.), 3rd edn., 1999, Satas & Associates, Warwick, pp. 652-683].

It is known, furthermore, that the surface roughness of release systems has an effect on the release forces, via the effective area of contact with the pressure-sensitively adhesive surfaces. By controlling the surface roughness it is possible to set the gradation of the release behavior on the two pressure-sensitively adhesive surfaces [U.S. Pat. No. 4,454,266].

The release force of silicone systems can be influenced, furthermore, by corona treatment or flaming [U.S. Pat. No. 3,632,386]. Moreover, the adhesive, via its chemistry, its film thickness, and its modulus, influences the release behavior. The release layer has chemistry, layer thickness, crosslinking density, modulus, and surface coverage (full-area or textured) that exert an influence on the release properties. The carrier material of the release liners influences the release properties via the roughness.

US 2008/311,333 describes further possibilities for how the release force of release systems can be influenced. An example application given there is an adhesive transfer tape in which the two surfaces are lined by two release liners which differ significantly in their release force. The liner to be removed first has a "light" release force, while the second liner has a "heavy" release force.

Surprisingly it has been found that in the sense of this invention it is possible to provide particularly advantageous products when the ratio of peel force of the second release liner from the second pressure-sensitively adhesive surface is balanced specifically with the bonding strength for the contact of the first pressure-sensitively adhesive surface on the target bond substrate, and adopts a minimum value. Only if this ratio is attained or exceeded is it possible to detach the second release liner cleanly from the second pressure-sensitively adhesive surface, without optical impairments occurring in the bond to the target substrate.

This newly found ratio of the bond strength of the bond generated via the first pressure-sensitively adhesive surface on the target substrate, on the one hand, and the peel force of the second release layer from the second pressure-sensitively adhesive surface, on the other hand, KK(fresh):AZK2, s inventive and advantageous for the use of the product when it amounts to at least 13.5, preferably at least 15.0, very preferably at least 20.0.

The benefit of knowing these values lies in the fact that a product developer faced with the bonding of a preselected adhesive system to an advised target substrate, is able to select more easily and more rapidly a release liner system which is particularly suitable for the combination of adhesive and bond substrate. Where a release layer which is to be used as second release layer conforms to the inventive ratio KK(fresh):AZK2 of at least 13.5, preferably at least 15.0, very preferably at least 20.0, then this second release layer can be detached from the second pressure-sensitively adhesive surface in such a way that the optical quality of the adhesive bond is not impaired.

A range of technical possibilities is available to the skilled person for the purpose of performing adjustment, in accordance with the invention, of the inventive ratio KK(fresh): AZK2.Customarily, first of all, the bond substrate, possibly including its surface energy, and the intended pressure-sensitively adhesive layer with which it is to be joined are known. From this knowledge it is possible, in particular by sample measurements of the bonding strength, to generate bond strength data. In combination with the inventive value ranges for the ratio of the bond strength of the bond produced by the first pressure-sensitively adhesive surface to the target substrate, on the one hand, and the peel force of the second release layer from the second pressure-sensitively adhesive surface, on the other hand, of at least 13.5, preferably at least 15.0, very preferably at least 20.0, it is possible to calculate an application-compatible design specification for the peel force of the second release layer from the second pressure-sensitively adhesive surface. It is therefore possible to limit the amount of release liners that are suitable for selection for this application, thus resulting in an increase in the efficiency of product development.

The skilled person, for setting the inventive ratio KK(fresh):AZK2, has available to him or her all of the techniques known from the prior art for adjusting the release properties (primarily the peel strength) of release liners in interaction with pressure-sensitively adhesive layers (in this regard, see also [D. Satas in "Handbook of Pressure Sensitive Adhesives Technology", D. Satas (ed.), 3rd edn., 1999, Satas & Associates, Warwick, pp. 632-651; D. J. Kinning, H. M. Schneider in "Adhesion Science and Engineering—Volume 2: Surfaces, Chemistry & Applications". M. Chaudhury, A. V. Pocius (ed.), 2002, Elsevier, Amsterdam, pp. 535-571; D. Jones, Y. A. Peters in "Handbook of Pressure Sensitive Adhesives Technology", D. Satas (ed.), 3rd edn., 1999, Satas & Associates, Warwick, pp. 652-683]). Here, any desired combinations of individual techniques or of two or more techniques are also possible. Examples, without wishing to impose any restriction as a result of this recitation, include the following:

Choice of release medium in relation in particular to composition, curing and/or coatweight.
Use of physical pretreatments of the release-effect surface.
Adaptation of the carrier thickness of the release liner.
Use of controlled release agents.
Structuring of the release layer.
Modification of the roughness of the release-effect surface.
Adaptation of the production concept, embracing direct coating of the PSA or lamination.

Peel forces as stated in connection with this disclosure are to be understood as relating to a peel speed of 300 mm/min. It is known that—customarily, and particularly with silicone-based release systems—the peel force increases when working with relatively high peel speeds. For such higher peel speeds as well it is possible to find inventive ratios, which are then below the peel force obtained for 300 mm/min. On the basis of the present invention, and by carrying out his or her own tests, the skilled person is able to determine corresponding values which such ratios must exceed at minimum, without that skilled person departing the bounds of this invention.

Product designs

The double-sidedly pressure-sensitively adhesive products which are used in the method of the invention are, in particular, double-sided adhesive tapes or adhesive sheets, and preferably adhesive transfer tapes or sheets.

The double-sidedly pressure-sensitively adhesive products used in accordance with the invention comprise at least one pressure-sensitive layer, if they contain no further carrier material, or at least two pressure-sensitive adhesive layers, if they contain a further carrier material. Encompassed by this in the context of this invention are also those double-sidedly pressure-sensitively adhesive products which have a layer of pressure-sensitive adhesive (PSA), the latter layer having an interlayer in the form of a carrier.

The construction of the double-sidedly pressure-sensitively adhesive products here comprises a first release layer and a second release layer, and also a PSA layer disposed between them. Where the release layers in question are release layers of different release liners, then the liners used may have a different shape and/or size. For example, one release liner may in terms of its dimensions protrude beyond the PSA layer and the other release liner. Likewise conceivable is a product construction in which the release liners have the same shape and/or size, and protrude in shape and/or size beyond the PSA layer. In one embodiment the double-sided pressure-sensitively adhesive product may be designed in a form corresponding to a label web. Thus, for example, a first release liner may be of web design, while the PSA layer is applied thereto in the form of repeating sections which are individualized, for example, by diecutting (similarly to label-shaped sections). The second release liner may then likewise be confined only to sections repeating in the region of the PSA, or may have a shape and/or size which correspond substantially to the shape and/or size of the first release liner. In the latter case, however, in one advantageous embodiment, diecuts are provided in the second release liner in the region of the PSA areas.

The coatweights of the one or more pressure-sensitive adhesive layers may be selected independently of one another. They are between 1 $g/m^2$ and 1000 $g/m^2$, more particularly between 10 $g/m^2$ and 500 $g/m^2$, very preferably between 20 $g/m^2$ and 250 $g/m^2$.

Where more than one pressure-sensitive adhesive layer is employed, the layers may be identical or different in respect of chemical, formulation and/or crosslinking state. Carrier-free versions as well may comprise two or more pressure-sensitive adhesive layers. An example of a combination for different types of PSA which may be combined in a double-sidedly pressure-sensitively adhesive product is a system composed of an acrylate-based pressure-sensitive adhesive layer and of a silicone-based pressure-sensitive adhesive layer.

Where a carrier is employed in the double-sidedly pressure-sensitively adhesive products as is the case especially for double-sided adhesive tapes, the film thickness in one preferred embodiment is between 4 µm and 150 µm, more preferably between 12 µm and 100 µm. It is possible for more than one carrier film to be employed, selected independently of one another in relation to raw materials class, formulation, chemical properties, physical properties, surface treatment and/or thickness. Where two or more carrier plies are employed, they may be joined to one another by further pressure-sensitive adhesive layers or else other adhesive layers such as heat-seal or cold-seal layers.

Where two release liners are employed for lining, their thicknesses may be identical or different. It is preferred to use two release liners of different thicknesses. Very preferably, in producing the dobule-sidedly pressure-sensitively adhesive products, the PSA which is to be adhered first to the target substrate is lined with the thinner release liner after coating and drying. In this scenario, the thicker release liner is coated preferably directly with the adhesive for the PSA layer that is to be adhered second.

The release layers in release liners A and B, and the top face and bottom face in dobule-sided release liners, may be selected independently of one another in relation to raw materials class, crosslinking type, degree of crosslinking, formulation, physical pretreatment, chemical pretreatment and/or coatweight, and also in relation to any structuring.

Release liners furnished double-sidedly with release layers preferably have a thickness of at least 20 µm and of less than 150 µm. For release liners furnished single-sidedly with a release layer, the same range of values is preferred.

Where release liner combinations are employed, the thicknesses of the release liner A and release liner B may be identical or different. Suitable release liner thicknesses are again between 20 µm and 150 µm. Particularly advantageous release liner thickness combinations consist of release liners having thicknesses in the range from 30 µm to 80 µm in each case. Particularly advantageous release liner thickness combinations are 36 µm (thickness of release liner A) and 50 µm (thickness of release liner B), and vice versa, and also 50 µm and 75 µm and vice versa.

Production

In the case of adhesive transfer products, in preferred production methods for the products according to the invention, a first release liner web is coated with a PSA. Typically this takes place with a solvent-containing formulation, which is subsequently dried. It is advantageous to select the PSA such that its crosslinking takes place at least partly during the drying operation. It may be advantageous if the crosslinking process is at an end at the end of the drying operation. Before the coated web is wound up, the top face may have a second release liner web laminated to it. This is done especially when the first release liner used is a single-sidedly release-furnished system. Products in bale form can be subsequently converted as desired—into stock rolls or strips by slitting, for example, or into film sheets by slitting, diecutting or cutting into lengths. The skilled person is aware of other methods for producing adhesive transfer tapes and sheets, which can be used likewise for products according to the invention.

Double-sidedly pressure-sensitively adhesive products that contain carriers can also be produced by methods which are known per se. Different sequences of coating and laminating operations are conceivable and can be employed advantageously. Just one example is given here. According to this example, a first release liner web is coated first of all with a first PSA. After drying, a carrier web is laminated on. This produces a first intermediate product, which can be laminated with a second carrier web coated with a second adhesive.

Use

Double-sidedly pressure-sensitively adhesive products of the invention are suitable for the connective adhesive bonding of two objects. They can be used with particular advantage for bonding to low-energy surfaces such as, in particular, polyolefinically furnished surfaces, polyolefinic components, and also nonpolar coatings and coating systems such as certain powder coatings and UV varnishes, which take on decorative and/or protective functions, for example. Great preference is given to their use in bonding tasks where particularly high optical quality for the bond is important. Such tasks include bonds of optical components and/or films of all kinds such as, for example, in displays, but also in extensive glass bonds. Accordingly, the present invention likewise relates to the use of the stated products for bonding transparent substrates.

Test methods

Test method A—Peel force: The peel force was determined as follows, in accordance with FINAT FTM 3. The peel force is determined by cutting a specimen of the release liner to a length of about 20 cm and a width of 50 mm. The release layer under investigation is contacted with a strip of the product comprising the PSA. The assembly is clamped in a tensile testing machine. At a speed of 300 mm/min and a peel angle of 180°, a measurement is made of the force needed to separate the assembly. Preparation and conduct of the measurement take place at 23° C. and at 50% relative humidity. The results are reported in the units cN/cm.

Test method B—bond strength: The procedure was in accordance with Afera ATM 5001 (as part of ATM 5001 Method C for carrier-containing double-sided adhesive tapes or Method E for adhesive transfer tapes). A strip 20 mm wide and about 20 cm long of a double-sidedly pressure-sensitively adhesive product is applied to a test plate and rolled on (by passing a weight in the form of a roll weighing 4 kg over it five times back and forth with a rolling speed of 10 m/min), with one end of the double-sidedly pressure-sensitively adhesive product remaining free. In the case of an adhesive transfer tape, the adhesive transfer tape is equipped on its rear side with an auxiliary polyester carrier for reinforcement. The test plate is clamped into the clamping jaw of a tensile testing machine (e.g. BZ2.5 from Zwick/Roell), and the free end of the double-sidedly pressure-sensitively adhesive product is clamped into the second clamping jaw of the tensile testing machine. At an angle of 180° and at a speed of 300 mm/min for determining the bond strength of the fresh bond, KK(fresh), the adhesive strip is detached from the substrate immediately after preparation, i.e. within five minutes following application and rolling onto the test plate (reflecting fresh bonding), and the force required for this detachment is recorded. Preparation and conduct of the measurement take place at 23° C. and at 50% relative humidity. The results are reported in the units cN/cm.

Test method C—Surface energy: The surface energy was determined by means of contact angle measurements. The contact angle is determined for the purpose of characterizing the wetting properties between solid and liquid bodies. In determining the contact angle, a drop of liquid is deposited using a syringe on the surface in question. The surface energy is determined in a Krüss contact angle measuring system G2. The measurement took place with a method according to Young Laplace with four drops of each of the test liquids. In this method, the test liquids used were double-distilled water and diiodomethane. Ten measurement values were determined for each drop. Measurement was evaluated by the method of Owens-Wendt-Rabel & Kaeble.

EXAMPLE 1

A polyacrylate with 7% acrylic acid and a Fikentscher k value of 55 was crosslinked with 0.6% of aluminum chelate and in the form of a solution in acetone/benzine was coated by a doctor blade method onto a release liner A (first release layer), dried, and lined with release liner B (second release layer). The coatweight of the pressure-sensitive adhesive layer after drying was 50 g/m². The design corresponded to that of an adhesive transfer tape. Release liner A was a siliconized 50 µm PET film based system. Release liner B was a siliconized 36 µm PET film based system. The peel force of release liner A and hence of release layer 1, AZK1, was 2.5 cN/cm. The peel force of release liner B and hence of release layer 2, AZK2, was 4.5 cN/cm. A test bond was performed on a polypropylene plate whose surface has a surface energy (determined by test method C) of 30 mN/m. This test gave a bond strength in the fresh state, KK(fresh), of 70 cN/cm. The inventive ratio, KK(fresh):AZK2, was therefore 15.6. The detachment process of the second release liner, i.e. in the present case, the second release layer, was investigated after the test strip had been freshly adhered to the polypropylene plate. The release liner was flawlessly detachable. The bond remained unaffected. This product therefore meets the stated requirements.

EXAMPLE 2

A polyacrylate with 10% acrylic acid and a Fikentscher k value of 82 was crosslinked with 0.4% of aluminum chelate and in the form of a solution in acetone/benzine was coated by a doctor blade method onto a double-sided release liner, dried, and wound up. The coatweight of the pressure-sensitive adhesive layer after drying was 50 g/m². The design corresponded to that of a roll of adhesive transfer tape. The peel force of release side 2 and hence of the second release layer, AZK2, was 7 cN/cm. A test bond was performed on a polypropylene plate whose surface has a surface energy (determined by test method C) of 30 mN/m. This test gave a bond strength in the fresh state, KK(fresh), of 100 cN/cm. The inventive ratio, KK(fresh):AZK2, was therefore 14.3. The detachment process of the second release side, i.e., the second release layer, was investigated after the test strip had been freshly adhered to the polypropylene plate. The release liner was flawlessly detachable. The bond remained unaffected. This product therefore meets the stated requirements.

COMPARATIVE EXAMPLE

A polyacrylate with 7% acrylic acid and a Fikentscher k value of 55 was crosslinked with 0.6% of aluminum chelate and in the form of a solution in acetone/benzine was coated by a doctor blade method onto a release liner A, dried, and lined with release liner B. The coatweight of the pressure-sensitive adhesive layer after drying was 50 g/m². The design corresponded to that of an adhesive transfer tape. Release liner A was a siliconized 50 µm PET film based system. Release liner B was a siliconized 36 µm PET film based system. The peel force of release liner 1, AZK1, was 4 cN/cm. The peel force of release liner 2, AZK2, was 7 cN/cm. A test bond was performed on a transparent polypropylene plate whose surface has a surface energy (determined by test method C) of 30 mN/cm. This test gave a bond strength in the fresh state, KK(fresh), of 70 cN/cm. The ratio, KK(fresh):AZK2, was therefore 10. The detachment process of the second release liner was investigated after the test strip had been freshly adhered to the polypropylene plate. The release liner was not flawlessly detachable. At certain points the layer of adhesive underwent local detachment from the substrate surface, leaving behind visible defects. This product therefore does not meet the stated requirements.

The invention claimed is:

1. A method for producing an adhesive bond of two substrates, at least one of which is transparent and at least one of which has a surface with a surface energy of not more than 40 mN/m,
   comprising the use of a double-sided pressure-sensitive adhesive product comprising a pressure-sensitive adhesive layer having first and second pressure-sensitive adhesive surfaces,
   wherein the double-sided pressure-sensitive adhesive product is an adhesive transfer tape comprising no more than one pressure-sensitive adhesive layer and does not comprise a carrier material,
   the first pressure-sensitive adhesive surface being lined with a first release system, and the second pressure-sensitive adhesive surface being lined with a second release system,
   wherein the pressure-sensitive adhesive layer has a coat-weight from 1 g/m² to 1000 g/m² and each of the first and second release systems has a thickness from 20 µm to 150 µm, wherein
   the peel force of the first release system from the first pressure-sensitively adhesive surface, $AZK_1$, is lower than the peel force of the second release system from the second pressure-sensitively adhesive surface, $AZK_2$, and
   the ratio of the bond strength of the fresh bond of the first pressure-sensitive adhesive surface to a surface having a surface energy of not more than 40 mN/m $KK_{fresh}$ to the peel force of the second release system from the second pressure-sensitive adhesive surface, $KK_{fresh}$:$AZK_2$, is at least 13.5,
   wherein $AZK_1$ is at least 2 cN/cm and the ratio of the peel forces, $AZK_1$:$AZK_2$ is from 1:1.5 to 1:4,
   wherein the method comprises:
   (a) parting the first release system from the first pressure-sensitive adhesive surface, and contacting the first pressure-sensitive adhesive surface with the surface of the first of the two substrates to be adhered having a surface energy of not more than 40 mN/m; and
   (b) parting the second release system from the second pressure-sensitive adhesive surface and contacting the second pressure-sensitive adhesive surface with the surface of the second of the two substrates to be adhered, wherein the bond strength of the second pressure-sensitive adhesive layer to the surface of the second of the two substrates is less than 35 mN/cm.

2. The method according to claim 1, wherein the double-sided pressure-sensitive adhesive product is wound up into an Archimedean spiral.

3. The method according to claim 1, wherein each of the first and second release systems comprises a release liner.

4. The method according to claim 1, wherein both substrates are transparent.

5. A product made according to the method of claim 1.

6. The method according to claim 1, wherein each of the first and second release systems has a thickness from 30 µm to 80 µm.

7. The method according to claim 1, wherein the pressure-sensitive adhesive layer has a coatweight from 20 g/m² to 250 g/m².

8. The method according to claim 1, wherein each of the first and second release systems is a siliconized film based system.

9. The method according to claim 8, wherein the siliconized film based systems are siliconized polyethylene terephthalate film based systems.

10. The method according to claim 1, wherein the pressure-sensitive adhesive layer comprises acrylic adhesives.

* * * * *